United States Patent
Surampudi et al.

(10) Patent No.: US 8,301,374 B2
(45) Date of Patent: Oct. 30, 2012

(54) POSITION ESTIMATION FOR GROUND VEHICLE NAVIGATION BASED ON LANDMARK IDENTIFICATION/YAW RATE AND PERCEPTION OF LANDMARKS

(75) Inventors: Bapiraju Surampudi, San Antonio, TX (US); Joe Steiber, Spring Branch, TX (US)

(73) Assignee: Southwest Research Institute, San Antonio, TX (US)

( * ) Notice: Subject to any disclaimer, the term of this patent is extended or adjusted under 35 U.S.C. 154(b) by 557 days.

(21) Appl. No.: 12/547,213

(22) Filed: Aug. 25, 2009

(65) Prior Publication Data

US 2011/0054791 A1   Mar. 3, 2011

(51) Int. Cl.
G01C 21/00 (2006.01)
G01C 21/34 (2006.01)
G08G 1/123 (2006.01)

(52) U.S. Cl. ............ 701/438; 701/23; 701/28; 701/409; 701/426; 701/445; 701/446; 701/448; 701/500; 701/505; 701/514

(58) Field of Classification Search .............. 701/23–28, 701/400–541, 300–302; 340/901, 905, 933–943, 340/995.1–996, 686.6
See application file for complete search history.

(56) References Cited

U.S. PATENT DOCUMENTS

| | | | | |
|---|---|---|---|---|
| 5,072,396 | A * | 12/1991 | Fitzpatrick et al. | 701/409 |
| 6,282,496 | B1 * | 8/2001 | Chowdhary | 701/446 |
| 6,615,137 | B2 * | 9/2003 | Lutter et al. | 701/301 |
| 6,640,106 | B2 * | 10/2003 | Gutowski et al. | 455/456.1 |
| 7,228,230 | B2 | 6/2007 | Hirokawa | 701/214 |
| 7,746,271 | B2 * | 6/2010 | Furstenberg | 342/357.23 |
| 2009/0140887 | A1 * | 6/2009 | Breed et al. | 340/990 |

OTHER PUBLICATIONS

Choi et al.; "Lateral Control of Autonomous Vehicle by Yaw Rate Feedback"; http://cat.inist.fr ; pp. 2, Dec. 2, 2008.

* cited by examiner

Primary Examiner — Thomas Tarcza
Assistant Examiner — Rami Khatib
(74) Attorney, Agent, or Firm — Chowdhury & Georgakis PC; Ann C. Livingston

(57) ABSTRACT

A landmark-based method of estimating the position of an AGV (autonomous ground vehicle) or conventional vehicle, which has an onboard database of landmarks and their locations coordinates. During travel, the AGV looks for and identifies landmarks. It navigates according to position estimations that are based on measured yaw rate and speed. When a landmark s encountered and recognized, its true location coordinates are looked up from the database. These true coordinates are then used to enhance position estimation accuracy between landmarks.

17 Claims, 9 Drawing Sheets

POSITION ESTIMATION FOR GROUND VEHICLE NAVIGATION BASED ON LANDMARK IDENTIFICATION/YAW RATE AND PERCEPTION OF LANDMARKS

TECHNICAL FIELD OF THE INVENTION

This invention deals with automated navigation in ground vehicles as well as non-autonomous vehicles.

BACKGROUND OF THE INVENTION

GPS (global positioning systems) have become ubiquitous in today's passenger vehicles. They are used for helping the driver navigate to a destination and do not have very high accuracy. Satellite reception in various urban settings can be sporadic and can result in loss of signal periodically. High accurate GPS is a very critical feedback in autonomous ground vehicles.

Unmanned urban ground vehicles (UGV's) are robotic platforms that are either remotely operated or autonomous. They are generally capable of operating outdoors and over a wide variety of terrain.

An autonomous UGV is essentially an autonomous robot with mechanisms that allow it to navigate on the surface of the ground. Among other tasks, a fully autonomous robot in the real world has the ability to travel without human navigation assistance.

One approach to the autonomous navigation problem is referred to as the Simultaneous Localization and Mapping (SLAM) approach. In the SLAM approach, the true world location of landmarks or of the vehicle itself is not needed. The basic operating methods of SLAM are the ability to place an autonomous vehicle at an unknown location in an unknown environment, have it build a map, using only relative observations of the environment, and then use this map to navigate. The main advantage of SLAM is that it eliminates the need for a priori topological knowledge of the environment. A solution to the SLAM problem is valuable in applications where absolute position or information is unobtainable.

Another approach to autonomous navigation uses GPS data. If GPS data is available to the vehicle, the vehicle can acquire GPS data live to determine its location. Alternatively, for environments where GPS data is not available, with the advent of advanced mapping information from companies such as Google, Yahoo and Microsoft, a priori knowledge of GPS coordinates of landmarks can be stored before driving a route. Based on perception technologies such as machine vision or LIDAR, and intelligent processing, landmarks can be identified en route. The vehicle determines its position based on GPS coordinates for the landmarks. Generally, once each current location is known, the vehicle can then navigate to a next location.

BRIEF DESCRIPTION OF THE DRAWINGS

A more complete understanding of the present embodiments and advantages thereof may be acquired by referring to the following description taken in conjunction with the accompanying drawings, in which reference numbers indicate like features, and wherein.

DETAILED DESCRIPTION OF THE INVENTION

Figure 1:
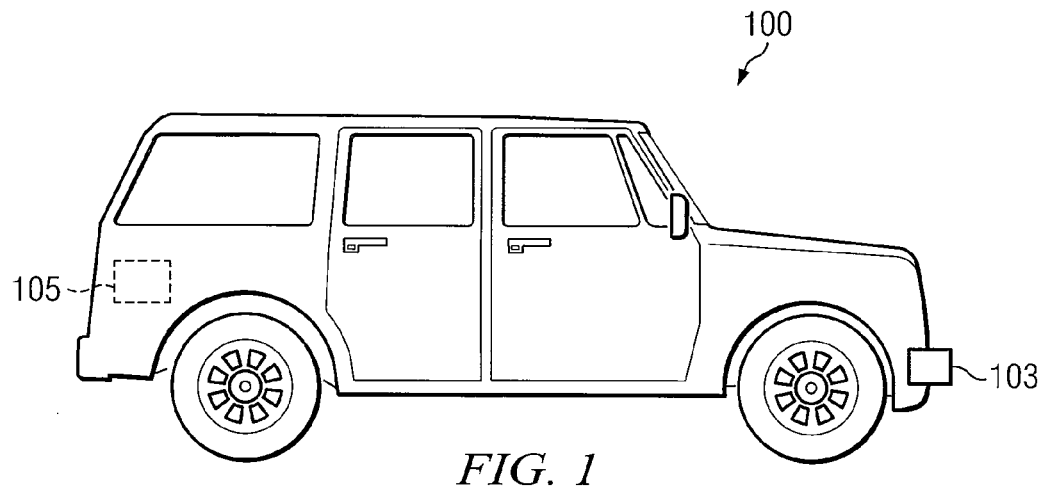
FIG. 1 illustrates an example of an autonomous AGV equipped with position-finding equipment in accordance with the invention.

The following invention describes at least two aspects of navigation in ground vehicles. One aspect is estimation of vehicle position during GPS outages based on urban landmarks. A second aspect is perception of such landmarks for supporting position estimation and for sensing lane deviations.

The methods described herein can be applied to autonomous ground vehicles, where GPS feedback is critical to staying on desired path and vehicle position estimation becomes essential during GPS outages. The methods can also be used for conventional vehicle location estimation for use in GPS-based driver navigation. The perception aspect of the invention can also be used for detecting deviation from lane in passenger cars and especially in trailer trucks. For example, in cab-trailer trucks, the weaving of the trailer can be dangerous and warning the driver at the inception of such oscillation can prevent a roll over.

The term "autonomous" is used broadly herein to refer to any vehicle that uses position data for navigation, whether as its sole, alternative, or back-up means of navigation. Thus, as indicated below, an AGV (autonomous ground vehicle) could be a driver-operated vehicle that uses GPS navigation. A "vehicle" can be any object capable of navigation. An example of a suitable setting for the AGV is an urban setting, where landmarks are abundant and their locations are known through GPS detection.

As explained below, an AGV looks for and recognizes landmarks during travel. The AGV begins from a landmark whose location coordinates are known. It then navigates according to position estimations that are based on measured yaw rate and speed. Once a next landmark is recognized, its exact (also referred to herein as "true") GPS coordinates are looked up from a database. These true coordinates are then used to enhance position estimation accuracy between landmarks. This method can be referred to as a "pseudo feedback" method. It should be understood that "GPS coordinates" is a readily understood term for geographical location coordinates, but coordinates could be obtained from sources other than GPS.

A typical application of the position estimation method is for AGVs that navigate in territory in which GPS locations can be obtained and stored, but in which no live GPS signal is available to the AGV. The method can also be used as a backup for AGVs that normally navigate by live GPS but for situations when the GPS signal is not available.

Fundamental in landmark-based AGV navigation is the identification of landmarks. The most reliable methodology is to utilize as much a priori information as possible from readily available mapping sources for the desired route.

Examples of a priori information are locations of major road features such as intersections, lane markings, cross roads, bridges, business buildings, and overpasses.

Once this high-level a priori world information is identified along the desired route, it is necessary to identify subfeatures that characterize these higher level landmarks. For example, an intersection can be characterized and identified by the presence of a stop sign, traffic lights, road markings, and even the shape of its curbs.

For purposes of this description, it is assumed that the AGV has onboard visual perception equipment and related processing equipment for identifying landmarks. An example of such equipment is LIDAR (Light Detection and Ranging) equipment, which applies an optical remote sensing technology to obtain data about a target object or surface. Similar to radar technology, which uses radio waves instead of light, LIDAR determines the range to an object by measuring the time delay between transmission of an optical (typically laser) pulse and detection of the reflected signal. LIDAR data processing techniques can be extended to provide imaging applications, such as landmark identification.

Figure 2:
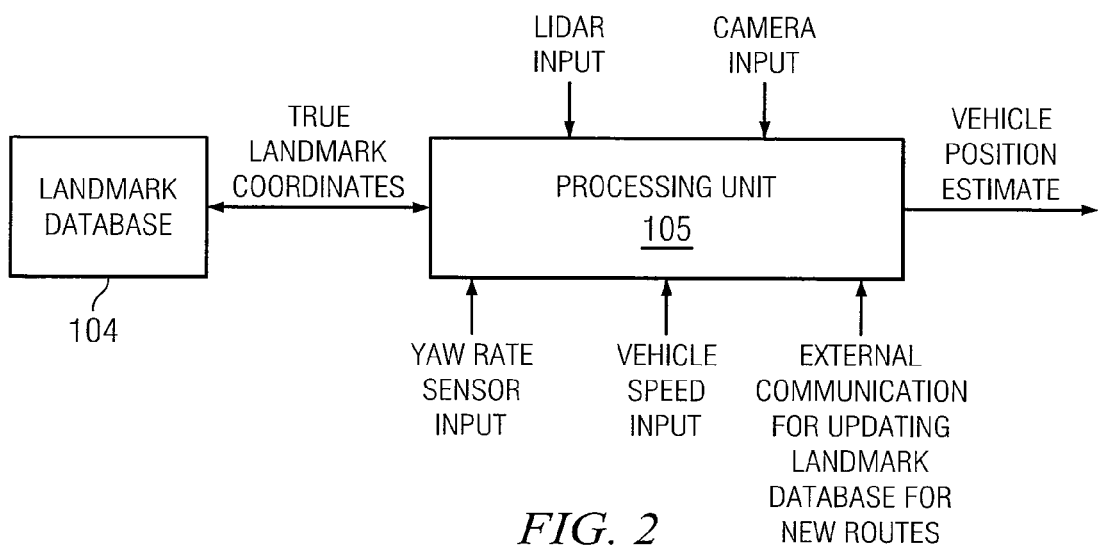
FIG. 2 illustrates the landmark database and processing unit of the AGV of FIG. 1.

FIGS. 1 and 2 illustrate an AGV 100 equipped for navigation in accordance with the invention. A visual perception unit 103 provides data for landmark recognition. In the example of this description, the visual perception is based on LIDAR technology; however, this methodology of perception is equally valid for devices such as optical cameras or sonars.

A landmark database 104 stores data representing various landmarks expected along the route of the AGV. For each landmark, database 104 also stores its GPS coordinates.

A processing unit 105 is programmed in accordance with the algorithm described below, to estimate the vehicle's position when landmarks are not available, and to correct the estimations when landmarks are identified. An example of a suitable implementation of landmark database 104 and processing unit 105 is a dSPACE AutoBox, equipped with appropriate memory and processing devices. This equipment is typically onboard the vehicle for prototyping demonstration. With the advent of powerful processors, integration of real time databases into automotive networks such as CAN is rapidly progressing from prototype to production-ready solutions. These technologies will see easy deployment of the navigation databases into production cars in the near future.

Suitable yaw rate sensors and speedometers are commercially available. A yaw rate sensor measures a vehicle's angular velocity around its vertical axis and its output is usually in degrees (or radians) per second. An inertial navigation system, such as that manufactured by Oxford Technical Solutions, has suitable yaw rate and speed rate sensors. AGV has whatever additional equipment is required to provide locomotion and steering, based on position data provided by processing unit 105.

Figure 3:
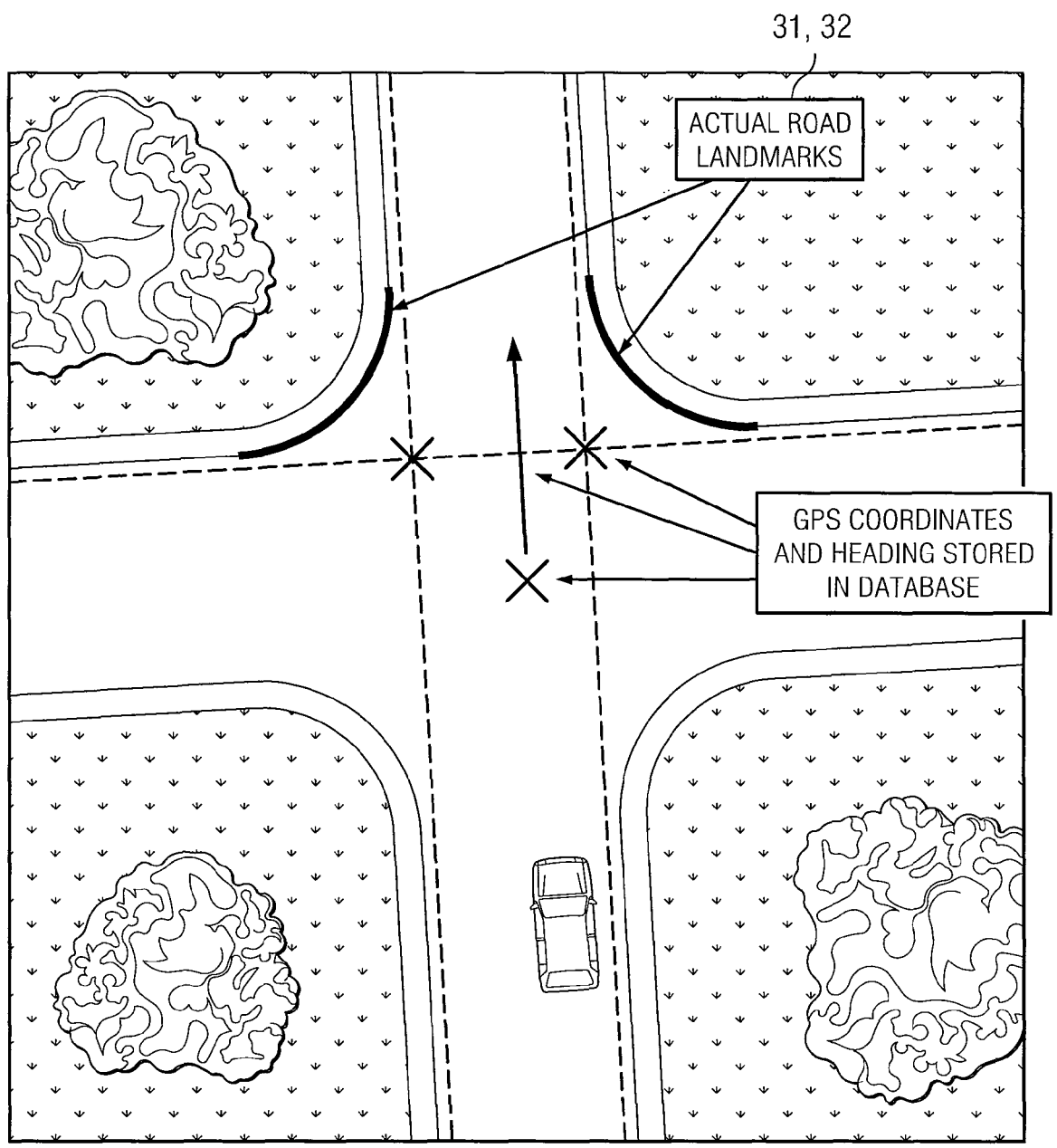
FIG. 3 illustrates an example of two landmarks encountered by the AGV en route.

FIG. 3 illustrates a road intersection being used as a landmark as AGV 100 approaches it. Each feature of a landmark is characterized by an individual GPS coordinate that may or may not lie on the landmark and has a fixed geometric relationship to the landmark. For example, an intersection can be characterized by a minimum of four GPS coordinates that lie at the geometric intersection of virtual lines (generated from curbs) that make up the two roads as shown in FIG. 3. These GPS coordinates are then available to the processing unit 105 from landmark database 104.

Examples of other suitable landmarks are road features such as lane markings, cross roads, bridges, business buildings or other architectural landmarks, and overpasses. Each landmark can then be characterized by its subfeatures. For example, an intersection can be characterized by signage, traffic lights, road markings, or curb shapes. Continued awareness of its position in real time enables efficient search of the database to match LIDAR data for identification.

On any given route, there may be limitless landmarks available as a priori data for storage in database 104. During travel, many landmarks may be difficult to identify and match against the a priori data. Although the more landmarks that can be identified and located, the more accurate the navigation, it may not be necessary to identify each and every landmark.

For navigation, processing unit 105 receives data representing vehicle speed, inertial yaw rate and the true location of landmark coordinates. It is assumed that there is always a landmark at the start of the route. For this initial landmark, coordinates are provided to processing unit 105 from landmark database 104.

As AGV navigates, LIDAR unit 103 continually detects potential landmarks. Also, processing unit 105 continually determines vehicle position.

When no landmark is currently identified, the position of the vehicle is given by some form of vehicle state estimation such as:

$$y_{est} = \int v \cos(H_{est}) dt$$

$$x_{est} = \int v \sin(H_{est}) dt$$

$$H_{est} = \int \dot{\psi} dt$$

, where $x_{est}$, $y_{est}$ are the estimated location (longitude and latitude with respect to a local origin), v is vehicle speed, $H_{est}$, is the estimated heading of the vehicle, and $\dot{\psi}$ the measured yaw rate of the vehicle.

When a vehicle passes a landmark that can be detected, identified, and located, the landmark's location values are read from database 104.

$$y_{est} = y_{landmark} + y_{offset}$$

$$x_{est} = x_{landmark} + x_{offset}$$

$$H_{est} = \theta_{landmark} + \theta_{offset}$$

, where $x_{landmark}$, $y_{landmark}$, $\theta_{landmark}$ are the true location (longitude, latitude and heading with respect to a local origin) of the landmark. $x_{offset}$, $y_{offset}$, $\theta_{offset}$ are the offsets of vehicle from the landmark in space and time. Typically, the offsets can be easily computed using basic geometry and image comparisons. For example, as vehicle 100 approaches an intersection, the actual image from LIDAR or camera can be matched against the intersection image in the database and the amount of mismatch gives the offsets (rotation, x and y).

Figure 4A:
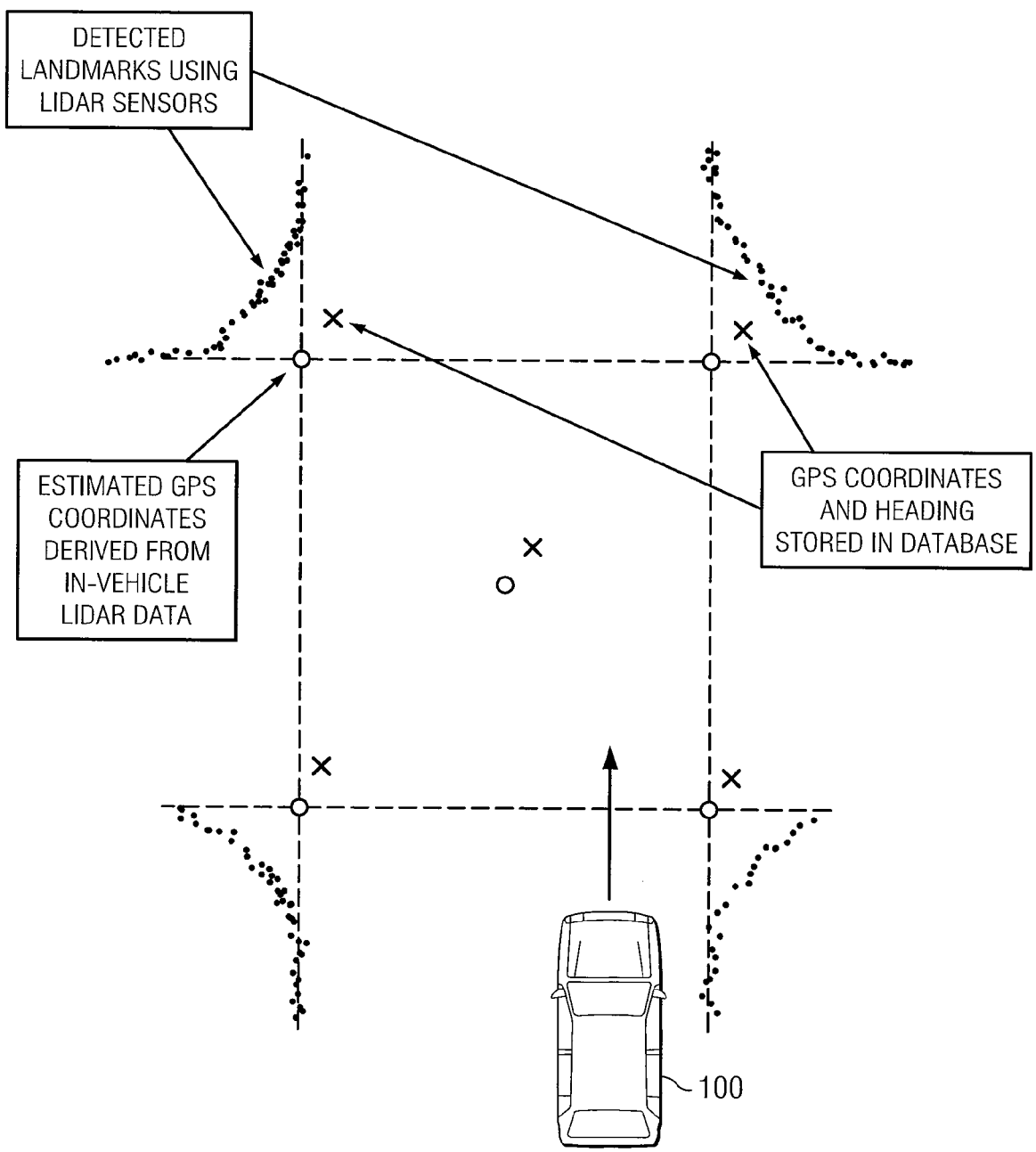
FIG. 4A illustrates the LIDAR identification of the landmarks and the estimated GPS coordinates for the landmarks.
Figure 4B:
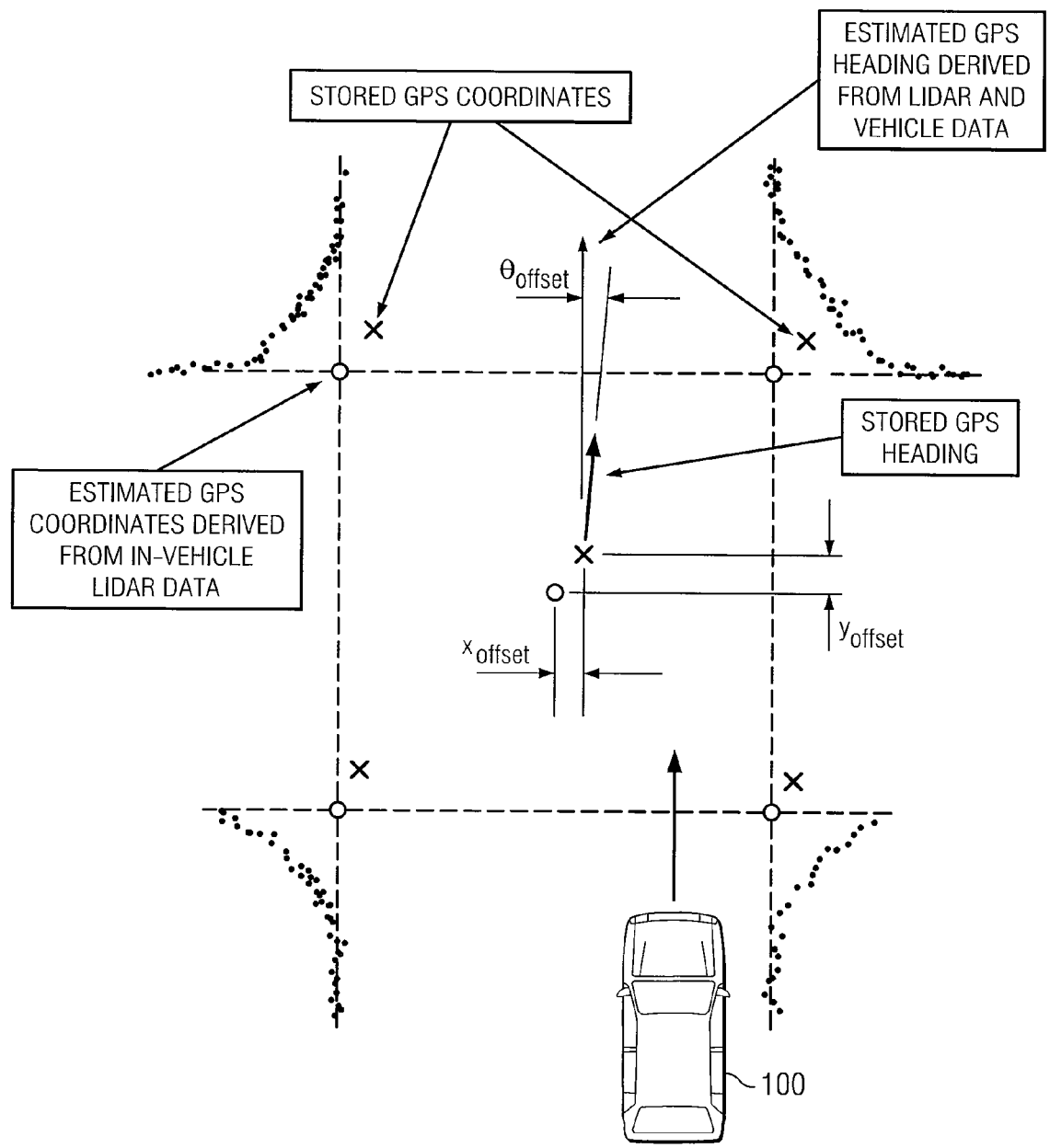
FIG. 4B illustrates the deviation (or offsets) between the stored global coordinates and estimated GPS coordinates.
Figure 4C:
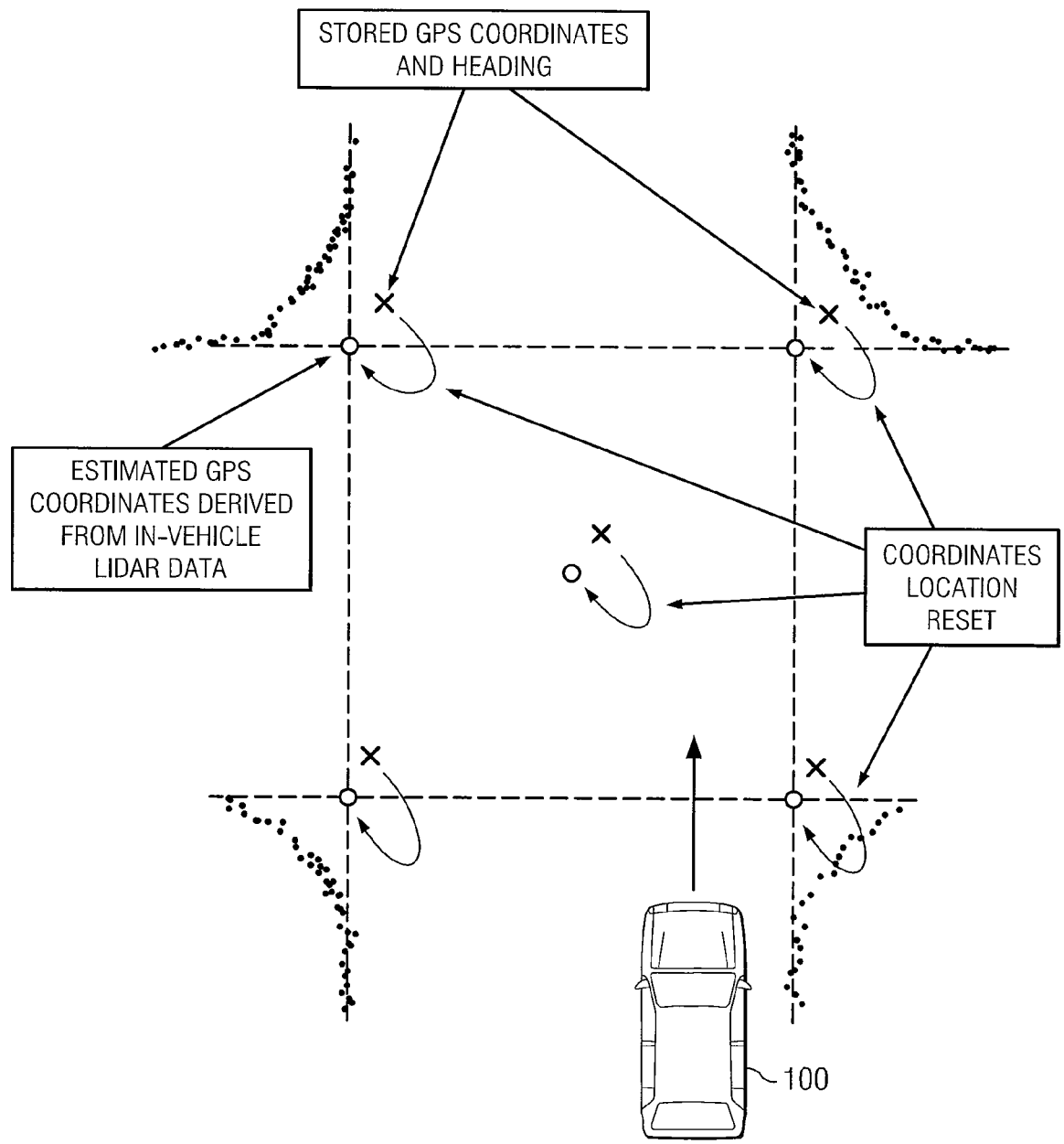
FIG. 4C illustrates the transformation (reset) necessary to adjust the estimated GPS values discussed in this embodiment.

Referring again to FIG. 3, and to FIGS. 4A-4C, for each landmark, its true location from apriori (stored) coordinates can be compared with its estimated location. FIGS. 4A-4C illustrate LIDAR sensor data obtained by LIDAR unit 103 for the intersection of FIG. 3. As illustrated, each landmark has been recognized based on features, history, and knowledge of driving route.

As illustrated, the LIDAR sensor data can be used to provide estimated GPS coordinates, which are corrected by the stored GPS data to determine the vehicle's true position. The vehicle's x and y locations can be corrected, as well as its heading, on the basis of the landmark's x and y coordinates and angular change. It must be noted that the vehicle does not have to be precisely at the landmark when the correction is applied. It may also be noted that the transformation does not need to occur while the vehicle 100 is in the intersection. It can be carried out prior to, in the intersection, or at some distance past the intersection since processing unit 105 maintains historical information of vehicle travel variables. Based on LIDAR data on relative position and heading of the landmark from the vehicle, landmark coordinates can be transformed to vehicle location precisely when the correction is applied.

Figure 5:
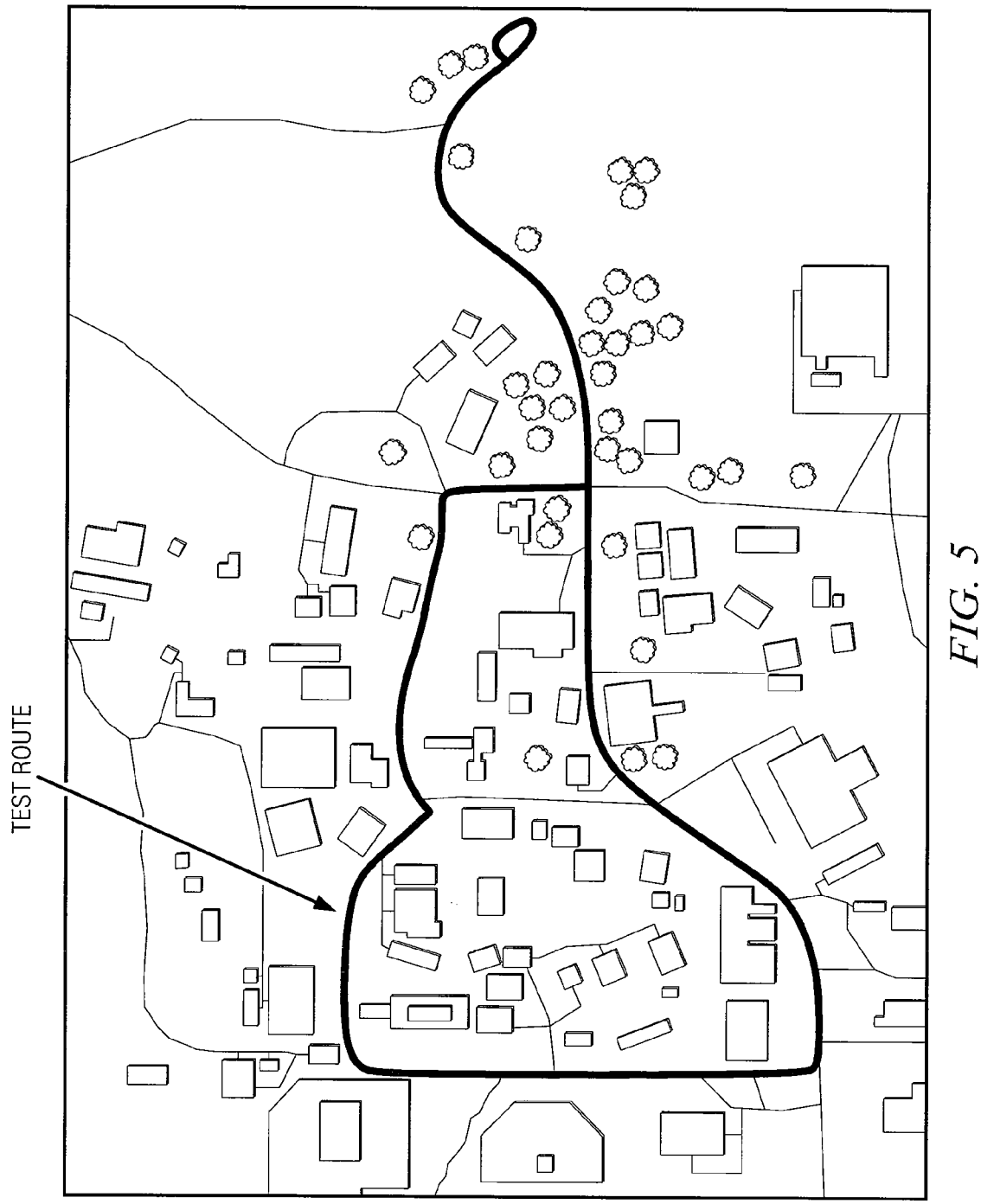
FIG. 5 illustrates a test route undertaken by the AGV.

FIG. 5 illustrates a test route for an AGV programmed to navigate with a landmark-based position estimation method in accordance with the invention described herein. Landmark coordinates were stored in database 104 for markers on the test route. All cross streets were used as landmarks. For test purposes, the vehicle was navigated along this route, and actual and estimated position data were acquired and compared.

Figure 6:
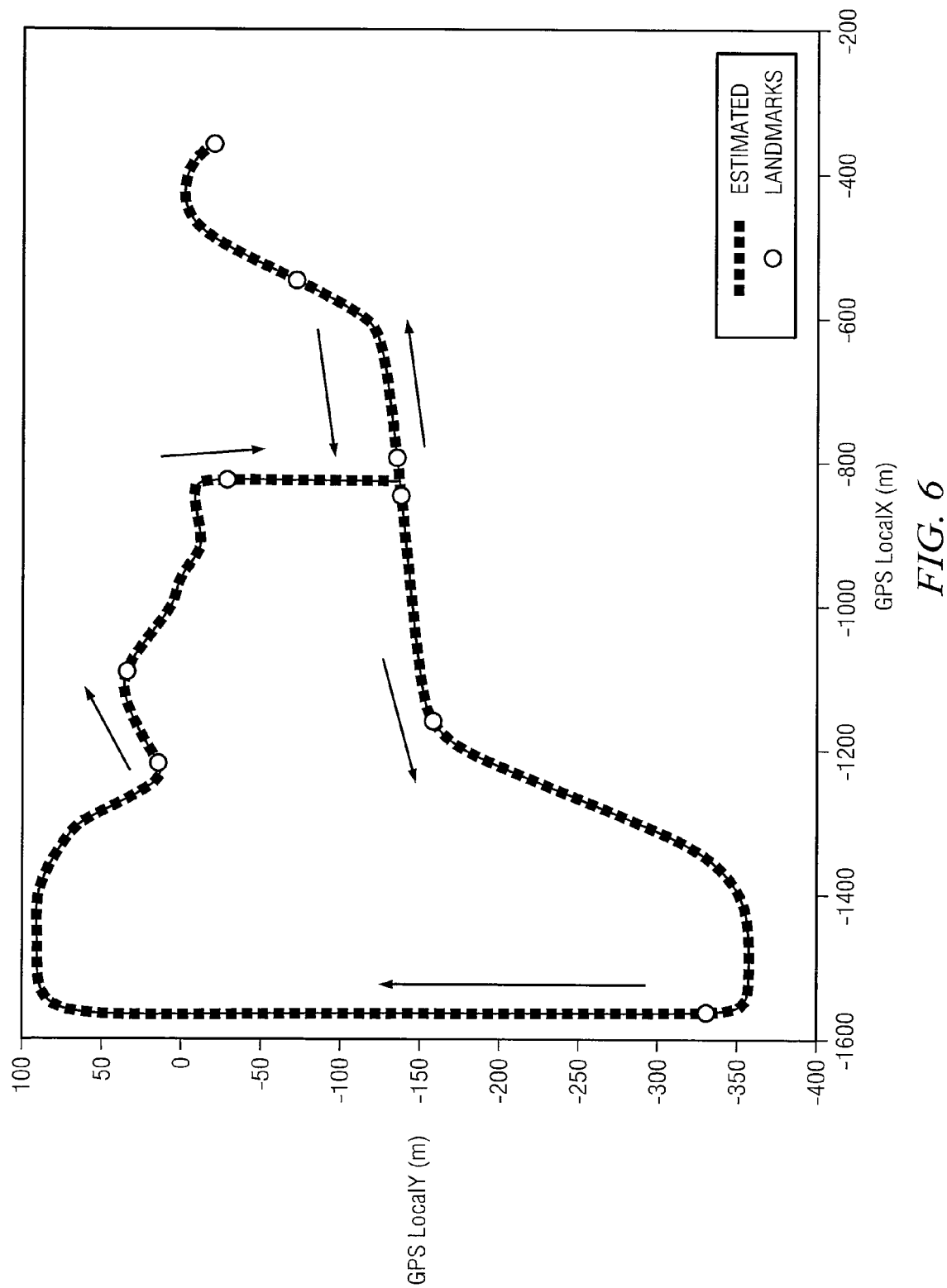
FIG. 6 illustrates the test route of FIG. 5 with its landmarks.
Figure 7:
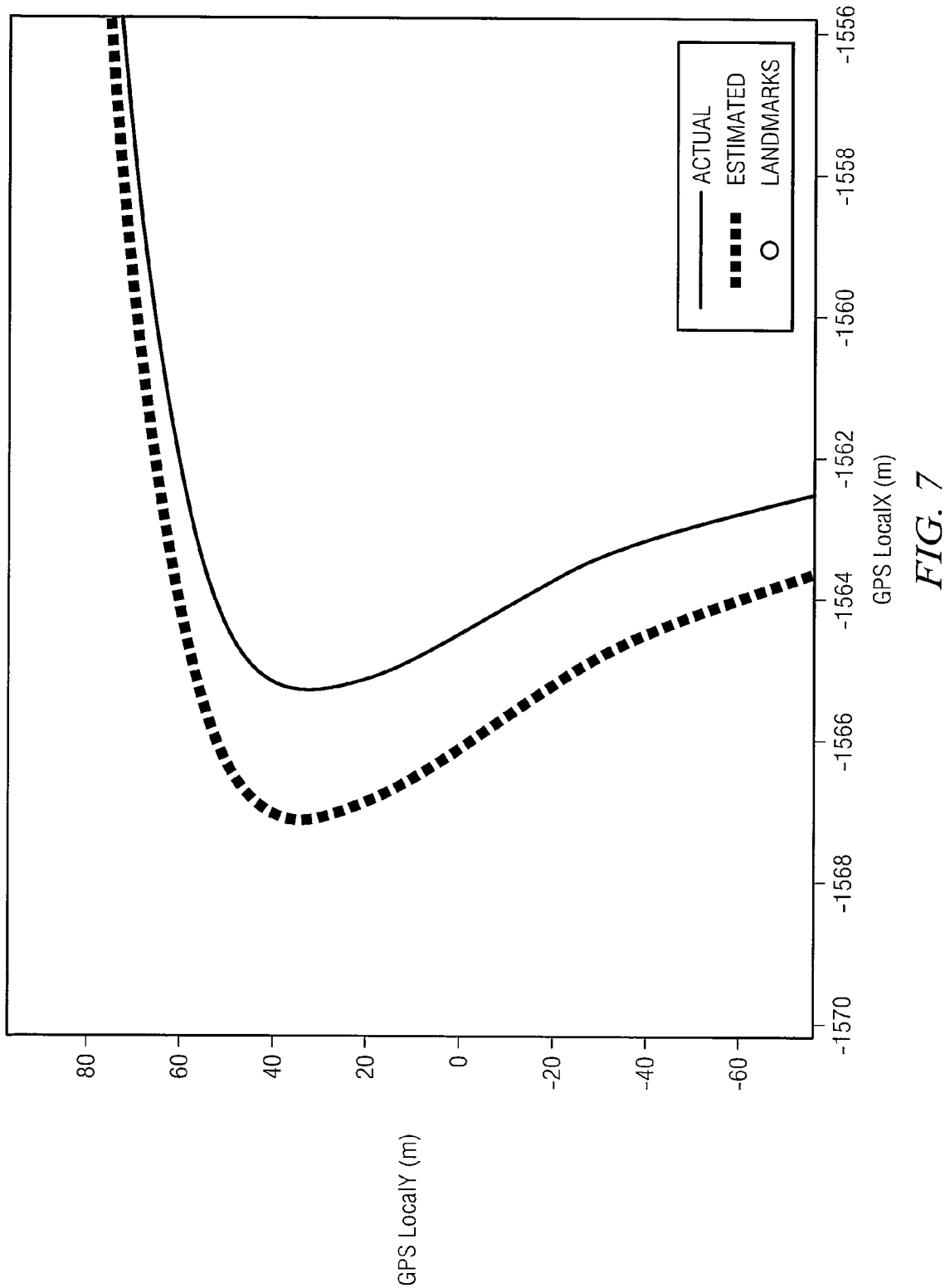
FIG. 7 illustrates the error between actual and estimated GPS coordinates for a portion of the test route.

FIGS. 6 and 7 illustrate, for the test route of FIG. 6, the results of comparing estimated locations determined by the AGV and actual locations determined by GPS. As illustrated, error in estimation is maximum (up to two meters) after traveling low curvature paths. The error is small when there is increased turning activity. This error can be reduced by increasing the number of landmarks on low curvature paths or improved state estimation algorithms.

As indicated above, the methods described herein can also be applied to GPS-based navigation of any commercial vehicle when satellite connectivity to GPS is lost. In this case, a yaw rate sensor and LIDAR are added along with an additional processing unit on the vehicle communication bus.

In the absence of landmarks, lane markings and onboard optical cameras can assist a vehicle to remain within a desired path. Detected deviation from lane direction can be used to determine the vehicle position with respect to the lane and issue lane departure warnings. It can provide alerts to swaying of trailers with respect to truck cabs and warn drivers of impending roll over.

Figure 8:
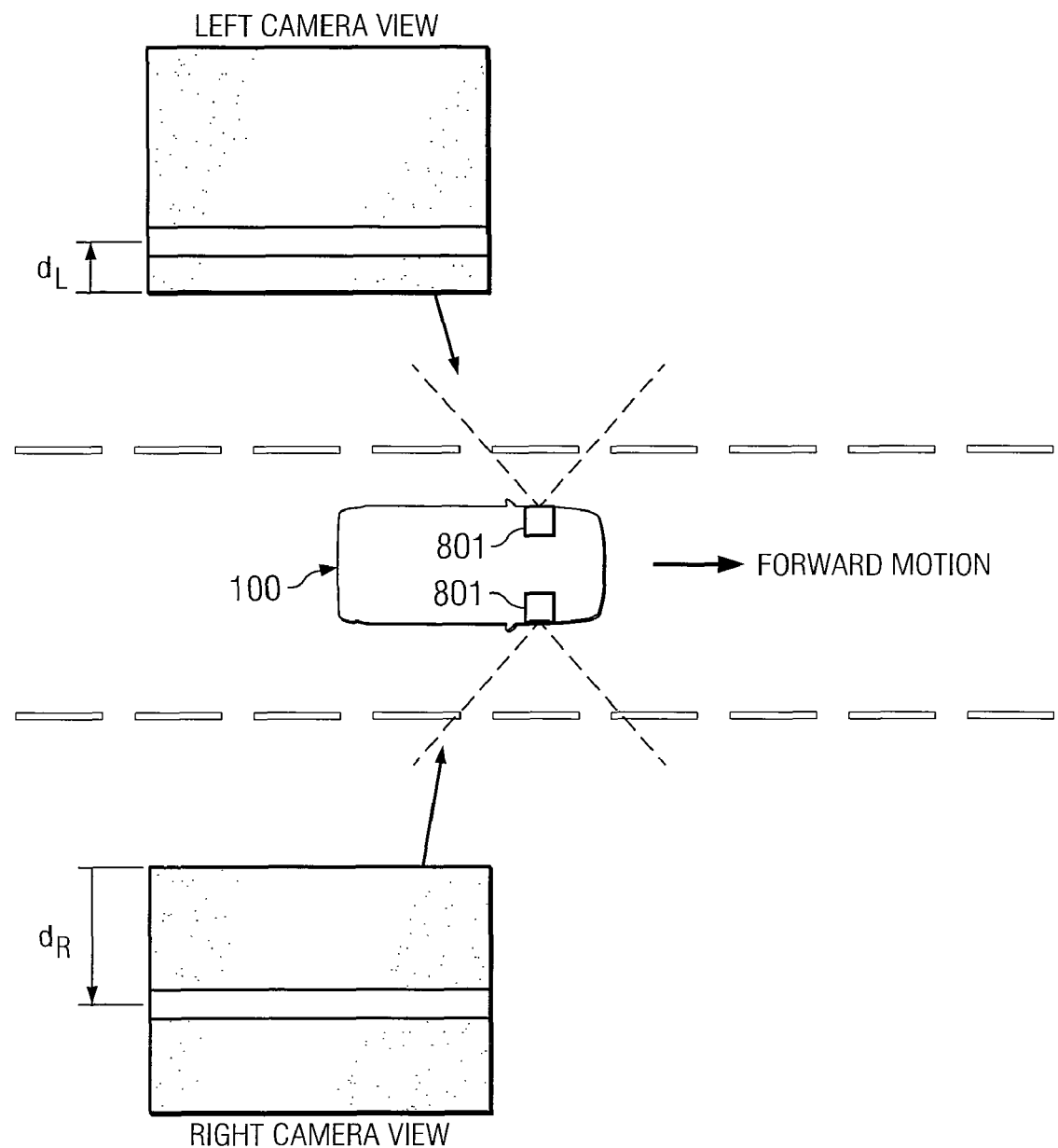
FIG. 8 illustrates the use of optical camera-based equipment to characterize lane markings as landmarks.

FIG. 8 illustrates the use of optical camera-based equipment to characterize lane markings as landmarks. In FIG. 8, an autonomous or conventional vehicle 100 is traveling from left to right within its lane. The method of FIG. 8 uses side-mounted cameras 801 for lane detection and defines a geometric relationship between the left and right lane markings (or lane width) as a feature of the landmark. The lane width is computed from the known width of the vehicle and the estimated distances from the left and right side of the vehicle (dL and dR) extracted from the images. These and other features of the lane markings can be incorporated into the database including lane color and shape (including breaks in certain sections of the road). These features are dependent on specific GPS coordinates. Thus, the matching of these features by the processing unit 105 allows the vehicle 100 to be accurately positioned during GPS outages. This technology can also enhance lane departure warning systems and alert the driver in heavy duty trailer trucks at the onset of trailer instability with reference to the cab.

What is claimed is:

1. A method of estimating a position of an autonomous ground vehicle during travel along a route, the ground vehicle having locomotion equipment and steering equipment, comprising:
    storing in a database, a set of landmarks and landmark location coordinates for each landmark;
    initializing position with known location coordinates;
    receiving current yaw rate and vehicle speed data;
    using visual perception equipment and the database to detect and identify landmarks;
    when no landmark is identified, using a processing unit to estimate current position data of the ground vehicle, the dead reckoning process performed by calculating latitude and longitude coordinates and a heading based on the current yaw rate and vehicle speed data;
    when a landmark is identified, using
        its landmark location coordinates to correct the current position data;
    wherein at least some of the landmarks are curbs, each curb at an intersection of two roadways, each of the roadways having two parallel boundary lines, and each curb having landmark location coordinates defined by the intersection of a boundary line of each of the roadways;
    wherein an intersection is identified by identifying at least two curbs, and at least one of the two curbs is used to provide landmark location coordinates to correct the current position data; and
    using the current position data to provide input to the steering equipment.

2. The method of claim 1, wherein the visual perception equipment is LIDAR, Optical Camera, or Sonar.

3. The method of claim 1, wherein the landmark location coordinates are GPS coordinates.

4. The method of claim 1, wherein the vehicle uses live GPS-based navigation when available and the method is used when live GPS navigation is not available.

5. The method of claim 1, wherein the vehicle is always navigated without a live GPS signal.

6. The method of claim 1, wherein the method is performed by said processing unit onboard the vehicle.

7. The method of claim 1, wherein at least one landmark is a lane marking.

8. The method of claim 1, wherein at least one landmark is a lane width.

9. The method of claim 1, wherein the step of using landmark location coordinates to correct the current position data is performed in part by providing offsets to the landmark location coordinates to adjust for the difference between the vehicle's actual position and the landmark location coordinates, and wherein the offsets are calculated by comparing an image of an intersection from the visual perception equipment to a stored image of the intersection.

10. A control unit for estimating a position of an autonomous ground vehicle during travel along a route, the vehicle having visual perception equipment, a yaw rate sensor, and vehicle speed sensor, comprising:
    a landmark database for storing a set of landmarks and each landmark's location coordinates;
    a processing unit programmed to perform the following tasks: to initialize position with known location coordinates; to receive current yaw rate and vehicle speed data; to use the visual perception equipment and the database to look for and to identify landmarks; when no landmark is identified, estimating the current position data of the vehicle by calculating location coordinates and a heading based on the current yaw rate and the vehicle speed data;
    when a landmark is identified, to use its landmark coordinates to current the current position data;
    to use the landmark location coordinates to correct the vehicle's current position data;
    wherein at least some of the landmarks are curbs, each curb at an intersection of two roadways, each of the roadways having two parallel boundary lines, and each curb having landmark location coordinates defined by the intersection of a boundary line of each of the roadways;
    wherein an intersection is identified by identifying at least two curbs, and at least one of the two curbs is used to provide landmark location coordinates to correct the current position data.

11. The control unit of claim 10, wherein the visual perception equipment is LIDAR or optical camera or sonar.

12. The control unit of claim 10, wherein the landmark location coordinates are GPS coordinates.

13. The control unit of claim 10, wherein the landmark database and processing unit are onboard the vehicle.

14. The control unit of claim 10, Wherein the processing unit is in data communications with a remote server programmed to more landmark data and to extract features of upcoming portions of the route.

15. The control unit of claim 10, wherein at least one landmark is a lane marking.

16. The control unit of claim 10, wherein at least one landmark is a lane width.

17. The system of claim 10, wherein the task of using landmark location coordinates to correct the current position data is performed in part by providing offsets to the landmark location coordinates to adjust for the difference between the vehicle's actual position and the landmark location coordinates, and wherein the offsets are calculated by comparing an image of an intersection from the visual perception equipment to a stored image of the intersection.

* * * * *